US012307264B2

(12) United States Patent
Sivagnanenthirarajah et al.

(10) Patent No.: US 12,307,264 B2
(45) Date of Patent: May 20, 2025

(54) USER ENGAGEMENT SURFACED THROUGH AN APPLICATION PROGRAMMING INTERFACE (API)

(71) Applicant: MICROSOFT TECHNOLOGY LICENSING, LLC, Redmond, WA (US)

(72) Inventors: Ugan Sivagnanenthirarajah, Seattle, WA (US); Sathyanarayanan Karivaradaswamy, Sammamish, WA (US); Sanjeev Chandra Reddy, Redmond, WA (US); Sanjana Ramakrishnan Sunder, Redmond, WA (US); Sayak Chatterjee, Seattle, WA (US); Sarah Anne Barnette, Seattle, WA (US); Mark Lin, Taipei (TW); Robert E. Harris, Jr., Woodinville, WA (US); Mike Ajax, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/850,794

(22) Filed: Jun. 27, 2022

(65) Prior Publication Data
US 2023/0359468 A1 Nov. 9, 2023

Related U.S. Application Data

(60) Provisional application No. 63/338,759, filed on May 5, 2022.

(51) Int. Cl.
G06F 3/00 (2006.01)
G06F 9/445 (2018.01)
G06F 9/54 (2006.01)

(52) U.S. Cl.
CPC ............ *G06F 9/44505* (2013.01); *G06F 9/54* (2013.01)

(58) Field of Classification Search
CPC ....................................... G06F 9/54
(Continued)

(56) References Cited

U.S. PATENT DOCUMENTS 6,608,552 B1 * 8/2003 Fogel .................. H05B 47/185
375/267
10,382,452 B1 * 8/2019 Dawes .................... H04L 63/02
(Continued)

FOREIGN PATENT DOCUMENTS

TW 201249739 A * 12/2012 ............. H03K 17/94

OTHER PUBLICATIONS

Tianxing Li, Real-Time Screen-Camera Communication Behind Any Scene. (Year: 2015).*
(Continued)

*Primary Examiner* — Lechi Truong
(74) *Attorney, Agent, or Firm* — Benjamin Keim; Newport IP, LLC (57) ABSTRACT

User engagement is detected and used to control operation of a computing device. User engagement is detected by a sensor such as a camera that identifies if a user's face is oriented towards a display device. If the user is not facing the display device, the sensor determines that the user is unengaged. The computing device is thus able to perform a power-saving operation, such as dimming the display device, when the user is unengaged. The computing device includes an API that abstracts sensor data into a user engagement signal indicating that the user is either engaged or unengaged. The OS and applications running on the computing device act on the user engagement signal provided by the API without communicating directly with the
(Continued)

sensor. The user engagement signal may be provided as an input to a state machine.

19 Claims, 6 Drawing Sheets

(58) Field of Classification Search
USPC .......................................................... 719/310
See application file for complete search history.

(56) References Cited

U.S. PATENT DOCUMENTS

| | | | | |
|---|---|---|---|---|
| 10,705,185 | B1* | 7/2020 | Lien ........................ | G06V 40/28 |
| 10,819,920 | B1* | 10/2020 | Hamlin ................. | G06F 1/1686 |
| 11,288,895 | B2* | 3/2022 | Chandel .................... | G06T 7/50 |
| 11,916,928 | B2* | 2/2024 | Decenzo ................. | H04L 63/08 |
| 2004/0153676 | A1* | 8/2004 | Krantz .............. | H04W 52/0225 |
| | | | | 713/300 |
| 2010/0205667 | A1* | 8/2010 | Anderson ............... | G06F 3/013 |
| | | | | 726/19 |
| 2014/0075457 | A1* | 3/2014 | Trethewey ............ | G06F 13/102 |
| | | | | 719/321 |
| 2014/0194102 | A1* | 7/2014 | Strazisar ........... | H04M 1/72454 |
| | | | | 455/418 |
| 2014/0340531 | A1* | 11/2014 | Jain ........................ | H04N 23/64 |
| | | | | 348/207.1 |
| 2016/0242024 | A1* | 8/2016 | Karren .................... | H04W 8/22 |
| 2017/0307332 | A1* | 10/2017 | Ooi ........................... | F41A 9/62 |
| 2018/0321731 | A1* | 11/2018 | Alfano ................. | G06F 1/3287 |
| 2018/0348842 | A1 | 12/2018 | Biron et al. | |
| 2019/0347181 | A1* | 11/2019 | Cranfill ............... | G06F 11/3013 |
| 2020/0131581 | A1* | 4/2020 | Jain ........................ | G16H 50/20 |
| 2020/0228645 | A1* | 7/2020 | Alberth, Jr. .......... | G01C 21/206 |
| 2021/0026454 | A1* | 1/2021 | Hong ................... | G06V 40/161 |
| 2021/0136137 | A1* | 5/2021 | Munoz ................. | H04L 67/563 |
| 2021/0298637 | A1* | 9/2021 | Vadlamudi-Reddy ...................... | |
| | | | | G01S 13/584 |
| 2021/0302563 | A1* | 9/2021 | Lemarchand ........ | A61B 5/7257 |
| 2021/0327394 | A1 | 10/2021 | Bui et al. | |
| 2021/0398562 | A1* | 12/2021 | Verbeke ............... | G11B 27/005 |
| 2022/0147142 | A1* | 5/2022 | Bui ....................... | G09G 3/3406 |
| 2023/0025457 | A1* | 1/2023 | Lin ........................ | G06V 40/18 |
| 2023/0195196 | A1* | 6/2023 | Raghavulu ............ | G06F 1/3265 |
| | | | | 713/323 |

OTHER PUBLICATIONS

Heather L. O'Brien, What is User Engagement? A Conceptual Framework for Defining User Engagement with Technology. (Year: 2008).*
Peter Taylor, Web APIs for environmental data. (Year: 2016).*
Tadashi Okoshi, Attention and Engagement-Awareness in the Wild: a Large-Scale Study with Adaptive Notifications. (Year: 2017).*
U.S. Appl. No. 63/338,759, filed May 5, 2022.
Viviano, et al., "Hardware Support App (HSA): Steps for App Developers", Retrieved From: https://docs.microsoft.com/en-us/windows-hardware/drivers/devapps/hardware-support-app-hsa--steps-for-app-developers, Dec. 15, 2021, 6 Pages.
Smith, et al., "Sensors Power Management", Retrieved From: https://docs.microsoft.com/en-us/windows-hardware/design/device-experiences/sensors-power-management-for-modern-standby-platforms, May 3, 2021, 12 Pages.
"HID Sensors Usages", In Whitepaper of Microsoft, Oct. 22, 2015, 163 Pages.
"PoRegisterPowerSettingCallback Function (ntifs.h)", Retrieved From: https://docs.microsoft.com/en-us/windows-hardware/drivers/ddi/ntifs/nf-ntifs-poregisterpowersettingcallback, Oct. 22, 2021, 4 Pages.
"Send Feedback to Microsoft with the Feedback Hub App", Retrieved From: https://support.microsoft.com/en-us/windows/send-feedback-to-microsoft-with-the-feedback-hub-app-f59187f8-8739-22d6-ba93-f66612949332, Retrieved on: Apr. 22, 2022, 5 Pages.
"SensorExplorer", Retrieved From: https://apps.microsoft.com/store/detail/sensorexplorer/9PGL3XPQ1TPX?hl=en-us&gl=US, Retrieved on: Apr. 22, 2022, 2 Pages.
Abzarian, et al., "HID Usage Tables for Universal Serial Bus (USB)", Retrieved From: https://www.usb.org/sites/default/files/hut1_21_0.pdf, Oct. 12, 2020, 319 Pages.
Hudek, et al., "Manufacturing Windows Engineering Guide (WEG)", Retrieved From: https://web.archive.org/web/20220218174336/https://docs.microsoft.com/en-us/windows-hardware/manufacture/desktop/manufacturing-windows-engineering-guide?view=windows-11, Feb. 11, 2022, 25 Pages.
Berrendonner, et al., "microsoft/busiotools", Retrieved From: https://github.com/microsoft/busiotools/blob/master/sensors/tracing/README.md, Jan. 9, 2020, 2 Pages.
Coulter, et al., "Sensors", Retrieved From: https://docs.microsoft.com/en-us/windows/uwp/devices-sensors/sensors, Aug. 31, 2020, 8 Pages.
Golden, Barry, "Camera Privacy Controls", Retrieved From: https://docs.microsoft.com/en-us/windows-hardware/drivers/stream/camera-privacy-controls, Mar. 18, 2022, 12 Pages.
Golden, et al., "Privacy Shutter Notification", Retrieved From: https://docs.microsoft.com/en-us/windows-hardware/drivers/stream/privacy-shutter-notification, Dec. 15, 2021, 6 Pages.
Graff, et al., "Windows Hardware Compatibility Program", Retrieved From: https://docs.microsoft.com/en-us/windows-hardware/design/compatibility/, Jun. 25, 2021, 2 Pages.
Hopkins, et al., "Introduction to the Sensor and Location Platform in Windows", Retrieved From: https://docs.microsoft.com/en-us/windows-hardware/drivers/sensors/, Jan. 20, 2022, 4 Pages.
Hopkins, et al., "Proximity Sensor Data Fields", Retrieved From: https://docs.microsoft.com/en-us/windows-hardware/drivers/sensors/proximity-sensor-data-fields?redirectedfrom=MSDN, Dec. 15, 2021, 1 Page.
Northrup, et al., "Display Settings Overview", Retrieved From: https://docs.microsoft.com/en-us/windows-hardware/customize/power-settings/display-settings, Apr. 21, 2020, 2 Pages.
"International Search Report and Written Opinion Issued in PCT Application No. PCT/US23/013560", Mailed Date: May 15, 2023, 12 Pages.

* cited by examiner

USER ENGAGEMENT SURFACED THROUGH AN APPLICATION PROGRAMMING INTERFACE (API)

PRIORITY APPLICATION

This application claims the benefit of and priority to U.S. Provisional Application No. 63/338,759, filed May 5, 2022, the entire contents of which are incorporated herein by reference.

BACKGROUND

Modern computing devices are designed to interact with and respond to users in increasingly sophisticated ways. Classical input devices such as keyboards and mice are now frequently augmented with or replaced by touchscreens and voice control. The increased variety of input devices provides new opportunities for computing devices to receive information from users. This information can be used to enhance the user experience and provide a more seamless human-computer interface.

SUMMARY

This disclosure provides techniques and systems that use user engagement to control operation of a computing device or software running on the computing device. User engagement includes active user engagement and passive user engagement. Active user engagement is when a user is actively providing input to a computing device such as when typing or moving a mouse. Passive user engagement is when a user interacts with or gives attention to a computing device without actively providing input. Passive user engagement is also referred to as user attention. For example, a user looking at a display device (e.g., as determined by a camera) is engaged with the display device even if they are not otherwise providing input through an input device such as a keyboard.

The opposite of user engagement is user unengagement. Detecting user unengagement provides for novel ways of controlling a computing device. The user may be present at a computing device but unengaged. Thus, detecting user engagement provides a richer set of information than only detecting user presence. Detecting user presence by itself identifies that a user is near the computing device without determining if the user is directing their attention to the computing device or not. In some implementations, first determining if a user is present is a precondition to evaluating whether or not the user is engaged. If the user is not physically present at the computing device, the user cannot be engaged. Thus, the existence or absence of user engagement is, in some implementations, a characteristic or attribute of user presence.

In one implementation, user engagement is detected by a camera that determines if the user is facing a display device. If the user is facing the display device, the user is engaged. The user is identified as facing the display device, in some implementations, by measuring an orientation of the user's face relative to a reference point. If the user is present in front of the display device but not facing the display device, such as looking away, the user is unengaged. One way of determining if the user is facing the display device is by measuring facial yaw angle relative to the display device. For example, if the user is determined to be facing more than a predetermined amount (e.g., 45°) to the left or the right of the center of the display device then the user is identified as being unengaged. Facial yaw angle can also be measured relative to another a reference point such as the edge of the display device If there are multiple cameras, or other types of sensors, available to the computing device one of the cameras is selected to use for determining user engagement in some implementations. However, it is also possible that data from multiple cameras is considered in aggregate to evaluate user engagement. If a single camera is selected, an arbitration process determines which camera to use. Generally, the camera that has the most direct view of the user's face while the user is looking at the display device is used. The most direct view is determined, in some implementations, by identifying the camera with the smallest angle between an orientation of the user's face and the camera. In some embodiments, the camera with the most direct view of the user's face may change during the user's engagement. In such cases, the camera selected to determine user engagement may change.

User engagement may be used to achieve the technical benefit of minimizing power consumption of a computing device. To achieve this, operation of the computing device is modified to reduce power consumption when the user is unengaged. For example, a display device may be dimmed to save power when the user is looking away. As a further example, video or graphics rendering, particularly processor-intensive operations, may be paused when the user is identified as being unengaged with the display device.

A sensor that is used to detect user engagement, such as a camera, interprets data collected by the sensor to evaluate whether the user is engaged or unengaged. This may be performed by firmware in the sensor or by software components that function together with the sensor. Sensor data from the sensor includes one or both of data detected by that sensor (e.g., image data for a camera) and an interpretation of the detected data which is an indication of user engagement. In some implementations, the sensor includes an artificial intelligence (AI) component chip of a system-on-a-chip that interprets the detected data to determine if a user is engaged or not. In some implementations, a sensor hub that is physically separate from the sensor contains the firmware that determines user engagement. The sensor data is typically received first at a sensor driver. In one implementation, the sensor data leaving the sensor includes only the interpretation of the user's engagement. The detected data in this implementation does not leave the sensor. This can protect user privacy if an image of the user's face is used to determine attention.

The sensor driver then passes the sensor data to an Application Programming Interface (API). The API "packages" the sensor data and exposes a user engagement signal in a standardized format. In one implementation, the user engagement signal is either a user engaged signal or a user unengaged signal. Use of an API that generates a user engagement signal allows for any type of sensor that can capture the requisite data to be used by an operating system (OS) and/or applications without direct communication with the sensor.

In one implementation, the user engagement signal from the API is provided to a state machine. The state machine controls operation of the computing device or an application running on the computing device. For example, the state machine controls operation of a display device. If the display device is powered on and the state machine receives a user unengaged signal from the API, the state machine generates a signal that dims the display device.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
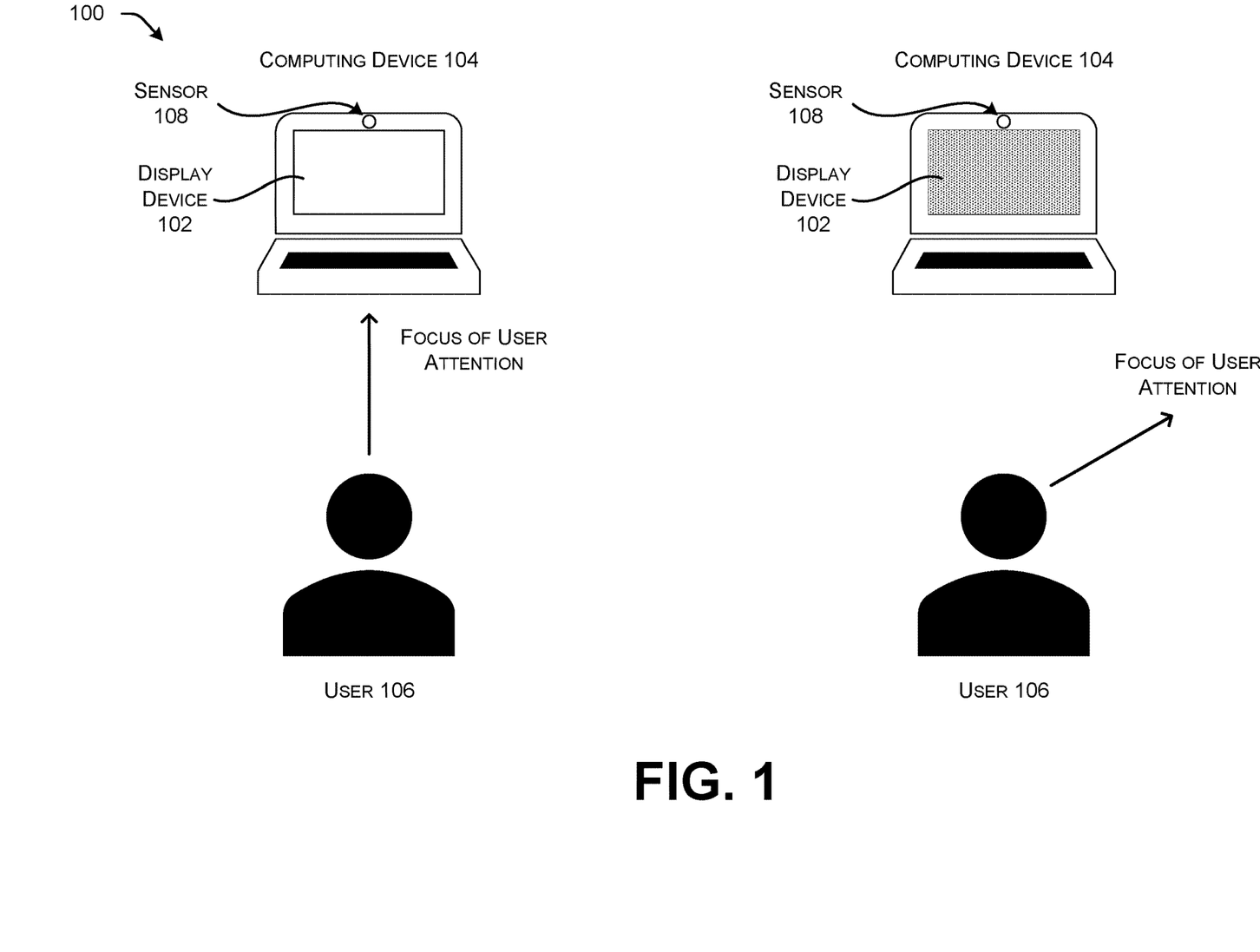
FIG. 1 illustrates an example of dimming of a display device when a user looks away, which indicates unengagement.

FIG. 1 illustrates an environment 100 in which a display device 102 of a computing device 104 is dimmed when a user 106 is unengaged. A sensor 108 integrated into or connected to the computing device 104 detects the focus of the user attention, which is used to determine user engagement. If the focus of user attention is on the display device 102, then the display device 102 is kept in an active state that is powered on a has a level of illumination suitable for comfortable viewing. When the focus of user attention is determined to be somewhere other than on the display device 102 and thus the user is unengaged, the display device 102 is dimmed. Dimming the display device 102 saves power by using less electricity than maintaining the display device 102 at a higher level of illumination. This is referred to as adaptive dimming.

In some implementations, when the user 106 is in front of the display device 102 with the display device 102 turned on, and it is detected that the user 106 is unengaged, the OS of the computing device 104 will dim the display device 102. This scenario makes use of a user engagement signal provided by an API. The user engagement signal may also be used by other applications as described below.

In some implementations, the computing device 104 is an electronic device with an integrated display device, such as a laptop, a smartphone, a tablet computer, a hybrid computer, or a wearable electronic device (e.g., a smartwatch, fitness band. In some implementations, the computing device 104 is an electronic device that has a physically separate displace device such as a desktop computer, set-top box, or video game console.

The display device 102 can be implemented as any type of display device (e.g., a monitor or screen) that renders visual information. The display device 102 can provide visual information, including text, such as correspondence, news articles, or literature; still images, such as drawings or photographs; videos, such as streamed videos, locally stored videos, or locally rendered videos or video information (such as a video game); or other visual information. In some implementations, the display device 102 is a backlit (such as a light-emitting diode (LED) backlight) or self-emitting (such as an organic LED) electronic display, cathode-ray tube, projector, or the like. The computing device 104 may include multiple display devices 102 (not shown).

In some of implementations, the sensor 108 is an internal sensor. In some such implementations, the sensor 108 is integrated into computing device 104, such as in the housing of the computing device 104 or the bezel of the display device 102. Alternatively, the sensor 108 is an external sensor in communication with the electronic device via a wired (e.g., USB, MIPI) or wireless (e.g., Bluetooth, WiFi) connection. An internal sensor is a sensor physically installed in the computing device 104. An external sensor is a sensor physically outside of the computing device 104. In an implementation, the sensor 108 is integrated into the computing device 104 at a position and orientation such that a user facing the display device 102 will also be facing the sensor 108. Thus, the orientation of the user's face relative to the sensor 108 may be used as a proxy for the orientation of the user's face relative to the display device 102. In some implementations, the computing device 104 includes, or is coupled to, multiple sensors 108 (not shown).

In implementations, the connection between the sensor 108 and the computing device 102 is a standard Human Interface Devices (HID) connection. Thus, the connection complies with the USB-IF HID Specifications. In an implementation, the sensor 108 reports according to the HID standard that it is capable of detecting human engagement. A HID compliant device will comply with the requirements for reporting sensors to the OS in HID as described in HID Usage Tables for Universal Serial Bus (USB) Versions 1.21, USB Implementer's Forum (2020) and HID Sensors Usages, Microsoft (Oct. 22, 2015).

In some implementations, the sensor 108 is a camera such as a red, green, blue (RGB) or infrared (IR) camera. In some implementations, the sensor 108 is an ultrasound or radiofrequency (RF) non-camera based sensor. The sensor 108 may be distance agnostic in which case it does not measure a distance between itself and the user 106. In other embodiments, the sensor 108 detects a distance between the sensor 108 and the user 106. One example of a sensor 108 that can detect distance is a time-of-flight camera. A time-of-flight camera is a range imaging camera system employing time-of-flight techniques to resolve the distance between the camera and the subject in an image, by measuring the round-trip time of an artificial light signal provided by a laser or an LED. The sensor 108 may also be any one of a number of other types of devices such as a light detection and ranging (LiDAR) sensor or an ultra-wideband radar.

Camera sensors conventionally capture an image frame for processing by the camera firmware and/or by software of the computing device. However, image frame capture can consume more power and generate more thermal energy than is necessary. In some implementations, a camera sensor according to the present disclosure includes firmware that enables discrete camera function. For example, the camera function may allow image capture at lower than the maximum resolution of the camera sensor. The captured image frame(s) can then be processed and provided to image or video capture applications loaded on and/or executed by the computing device.

In some implementations, the sensor 108 provides sensor data that is used for facial presence detection. Facial presence detection is scanning to detect a face and providing a bounding box around the face. Facial presence detection does not involve distinguishing one face from another face, predicting or classifying facial attributes. Facial presence detection may be performed on images from IR and RGB cameras. Facial presence detection may be performed with data from a low-resolution video camera by scanning for human faces (e.g., using Viola-Jones object detection). In some implementations, distinguishing between faces or detection of facial attributes is not performed. In one implementation, the sensor 108 uses facial bounding boxes to detect the presence and orientation of a human face.

The sensor 108 (e.g., a camera) is typically placed so that a user 106 facing the center of the display device 102 is also facing the camera. Thus, the orientation of the user's face relative to the camera is an accurate proxy measurement for the orientation of the user's face relative to the display device 102. However, if the sensor 108 is offset by a known distance or angle from the display device 102 appropriate adjustments are made to determine if the user is directing their attention to the display device 102 or not.

In one implementation, user engagement is determined based on facial yaw angle. With a human head facing the sensor 108, yaw is the angle of the head left and right (rotation around the Y-axis/axis from neck to top of head); the pitch is the angle of the head up and down (rotation around the X-axis/axis through ears); and roll is the tilt angle of the head (rotation around the Z-axis/axis from nose to back of head). Detection of head pose, including facial yaw angle, can be accomplished by any suitable technique.

In one implementation, the user 106 is engaged if the facial yaw angle is +/−45° relative to the perpendicular of the sensor 108. If the sensor 108 is a camera, the perpendicular of the sensor is a line extending directly away from a center of a plane defined by an image captured by the sensor 108. If the sensor 108 is positioned such that a person looking directly at the sensor 108 would also be looking directly at the display device, then the perpendicular of the sensor serves as a proxy for a perpendicular of the display device (a line extending directly away from a center of a plane defined by the screen of the display device). Thus, the user 106 is considered to be unengaged if the facial yaw angle is more than +/−45° relative to the perpendicular of the sensor 108 (e.g., looking far to the right or the left of the display device 102). Conversely, the user 106 is considered to be engaged if the facial yaw angle is less than +/−45° relative to the perpendicular of the sensor 108. Of course, any other threshold yaw angle may alternatively be used to determine user engagement such as +/−30°, 35°, 40°, 45°, 50°, 55°, or 60° relative to the perpendicular of the sensor 108. Use of facial yaw angle for detecting user engagement is more accurate in scenarios in which the user 106 is positioned no more than a threshold amount off-axis from the center of the camera (e.g., no more than 20°, 25°, 30°, 35°, or 40°). Thus, if the user 106 is not positioned approximately in line with the perpendicular of the display device 102 facial yaw angle is not used to determine user engagement. In some implementations, facial pitch and facial roll are not used to determine user engagement. However, in other implementations, one or both facial pitch and facial roll are used together with facial yaw to determine user engagement.

In an implementation, the sensor 108 has a minimum viable range of 0.2 m-1.2 m. Thus, the presence of the user 106 can be detected at 1.2 m. The sensor can also report user presence at a distance of 20 cm. In an implementation, the sensor 108 has in use power of <50 mw for an internal sensor. In an implementation, the sensor 108 has standby power use of <25 mw or <5 mw for an internal sensor. Standby power use is measured by the power drain of the sensor when the system is in standby. For an external sensor power consumption, both in use and standby, is determined by the power limitation of the bus. Power consumption encapsulates the entire sensor subsystem, including the transmitter, receiver, and any LEDs used.

If the sensor 108 is capable of detecting distance of the user 106, the distance accuracy is, in one implementation, +/−5 cm at all distances. For example, accuracy can be measured by tests performed at 45 cm, 75 cm, and 120 cm.

The sensor 108 has sensor latency. Sensor latency is the time from FW recognition of human presence to the sensor driver receiving that message. It is known that an OS of the computing device 104 has variable latency time for wake once the signal is received from the sensor. In various implementations, sensor latency is <0.33 s or <0.25 s.

Figure 2:
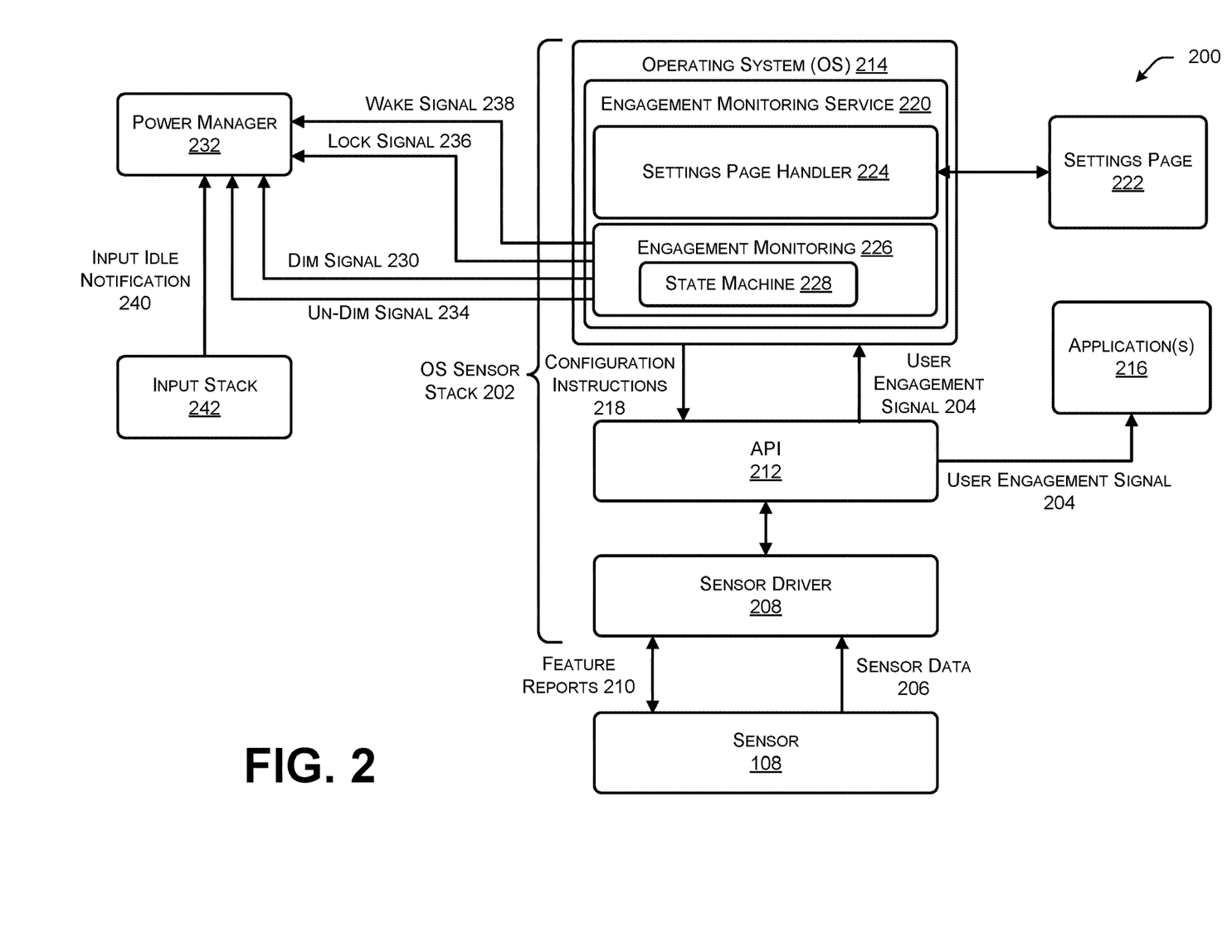
FIG. 2 is a schematic diagram of an example stack that generates and uses a user engagement signal.

FIG. 2 is a schematic diagram 200 of an OS sensor stack 202 that generates and uses a user engagement signal 204. The sensor 108 provides sensor data 206 to a sensor driver 208. For example, if the sensor is a camera, then the sensor driver 208 is a camera driver. The sensor data 206 is provided by firmware of the sensor 108. As discussed above, the sensor data 206 includes a characterization of the user being engaged or unengaged. The specific techniques by which the sensor 108 determines user engagement depend on the type of sensor. For example, if the sensor 108 is capable of detecting features on a human face, then facial yaw angle can be used to determine user engagement. In some implementations, the sensor data 206 is provided to the sensor driver 208 in an input report. The input report contains data sent from an HID device to the sensor driver 208. In an implementation, the sensor 108 also reports user presence.

The sensor driver 208 is a native driver for the OS on the computing device (e.g., an "inbox driver") or the sensor driver 208 is written specifically for the sensor 108 (e.g., a Sensor Class Extension Driver or CLX driver). A CLX driver may be provided together with the sensor 108 and is not included with the OS of the computing device. A CLX driver handles communication between the sensor and the computing device over the bus.

The sensor 108 provides feature reports 210 to the sensor driver 208 and receives feature reports 210 from the sensor driver 208. The feature report 210 from the sensor 108 identifies the sensor 108 as one capable of reporting user engagement and provides additional information about how the sensor 108 communicates information to the sensor driver 208.

In an implementation, the sensor driver 208 is an HID compliant driver. If the sensor 108 complies with the HID protocol, the feature report 210 sent from the sensor 108 defines the data packets and then presents a "HID descriptor" to the OS 214. The HID descriptor is a hardcoded array of bytes that describes the sensor's data packets. This can include how many packets the sensor 108 supports, the size of the packets, and the purpose of each byte and bit in the packet.

The feature report 210 sent from the sensor driver 208 to the sensor 108 contains data sent from an OS 214 or application 216 on the computing device. Data going to a HID device is referred to as an output report. For example, the output report instructs a camera to activate an LED to show that the camera is in use.

The sensor driver 208 processes the sensor data 206 and provides the processed sensor data 206 to an API 212. The sensor driver 208 receives signal packets from the sensor 108. The signal packets are un-packetized at the sensor driver 208 and repackaged into OS-consumable data as key values. A sensor series layer of the OS 214 interprets the key values.

The API 212 receives the sensor data 206 including the indication of user engagement and produces a user engagement signal 204. The API 212 exposes the capabilities of the sensor 108 to the OS 214 and applications 216 on the computing device without requiring the applications 216 or OS 214 to be able to interpret the sensor data 206. In an implementation, the user engagement signal 204 is a binary signal that reports either user engaged or user unengaged. Alternatively, the user engagement signal 204 reports engagement along a continuum as multiple different levels of user engagement ranging from fully engaged to fully unengaged with one or more intermediate levels of engagement also reported. If the API 212 additionally reports user presence, the API 212 is configured to report one of three different user states: not present/unengaged, present/unengaged, or present/engaged. If a user is not present, meaning physically not near the computing device, it necessarily implies that the user is not engaged.

In an implementation, the API 212 is included as a component of an OS in the OS sensor stack 202 so that the OS and applications 216 can receive a user engagement signal 204 from any type of compatible sensor 108 connected to the computing device. This abstracts the sensor data 206 into a single signal from the API 212 that can be used by the OS and applications 216 without direct communication with the sensor 108 or the need to interpret the sensor data 206. For example, an application 216 may pause playback of a movie if the user engagement signal 204 indicates that a user is unengaged.

The API 212 receives configuration instructions 218 from an engagement monitoring service 220. The configuration instructions 218 provide instructions for configuration of the API 212, such as if a user engagement signal 204 is to be generated or not, the threshold between engagement and unengagement, an arbitration policy for selecting between multiple sensors, and a time delay before acting on a change in the user engagement signal 204.

The engagement monitoring service 220 monitors user engagement signals 204 and is a part of the OS sensor stack 202. The engagement monitoring service 220 is responsible for starting the sensor 108 during normal operation or standby of the computing device. Settings changes implemented by a user through a settings page 222 are received by a settings page handler 224 of the engagement monitoring service 220. Settings received by the settings page handler 224 are provided to the API as the configuration instructions 218 which in turn are provided to the sensor 108 as a feature report 210. For example, the settings page handler 224 receives inputs from a user interface indicating that engagement monitoring is to be turned on or turned off. For example, user input to the settings page is provided through a menu and/or graphical user interface such as by a toggle switch that indicates if the OS will automatically dim a display device in response to user unengagement.

The engagement monitoring service 220 includes engagement monitoring 226 which consumes the user engagement signal 204 and is configured to change the operation of the computing device through the OS 214. Thus, engagement monitoring 226 represents use of the user engagement signal 204. For example, the OS 214 uses engagement monitoring 226 to implement adaptive screen dimming.

In some implementations, the engagement monitoring 226 includes a state machine 228 that uses the user engagement signal 204 as an input to change the state of the computing device. An application 216 running on the computing device may also use a state machine (not shown) to process the user engagement signal 204. A state machine 228, or finite-state machine (FSM), is a mathematical model of computation. It is an abstract machine that can be in exactly one of a finite number of states at any given time. The state machine 228 changes from one state to another in response to some input(s), and the change from one state to another is called a transition. A state machine 228 is defined by a list of its states, its initial state, and the inputs that trigger each transition. The possible states for the state machine 228 include user present: yes or no, user engaged: yes or no, display device on: yes or no, display device dimmed: yes or no, and the transitions include user becoming present, user becoming not present, user becoming engaged, user becoming unengaged, display device being turned on, display device being turned off, display device becoming dimmed, and display device becoming not dimmed.

A state machine 228 for controlling the power and brightness of a display device additionally takes as input a current power state of the display device and a current brightness level of the display device. The inputs are used to identify the current state of the display device. For example, if a display device is powered on and at full brightness, the user engagement signal 204 indicating that the user is unengaged triggers a transition to a dimmed state for the display device. In this case, the engagement monitoring 226 generates a dim signal 230. The dim signal 230 is received by a power manager 232 that controls power going to the display device. In an implementation, the state machine 228 provides hysteresis by waiting at least a predetermined amount of time (e.g., 5, 10, 15, 20, 25, 30, 35, 40, or 45 seconds) before sending the dim signal 230 to avoid switching to the dimmed state when a user briefly looks away from the display device. For example, in some implementations the engagement monitoring service does not generate the dim signal unless the user unengaged signal has been received for at least a threshold amount of time (e.g., 10, 20, 30 seconds).

If, the display device is in the dimmed state and user attention returns to the display device, the API 212 sends a user engagement signal 204 indicating that the user is engaged. The state machine 228 then causes the engagement monitoring 226 to generate an un-dim signal 234. The un-dim signal 234 is received by the power manager 232 which returns the display device to the previous level of brightness it was at before dimming. In an implementation, the state machine 228 does not introduce a delay before sending the un-dim signal 234. An appropriately configured state machine 228 may, of course, be used for controlling other aspects of the computing device besides screen brightness and for controlling the operation of applications 216.

In one implementation, user presence is used to lock the display device when the user is not present. In one implementation, user engagement is used to lock the display device when the user is unengaged. User presence can be determined by the sensor 108 and exposed through the same API 212 that exposes user engagement or by a different API. If a user not present signal is received by the engagement monitoring 226, it sends a lock signal 236 to the power manager 232 that results in locking of the display device. Locking of the display device can result in the display device ceasing to display an image on the screen and entering a low-power state (e.g., sleep) or the display of a lock screen while maintaining the displace device in an active state. If user presence and/or attention is later detected by the sensor 108, the corresponding user engagement signal 204 processed by the state machine 228 results in engagement monitoring 226 sending a wake signal 238 the power manager 232. The wake signal 238 returns the display device to a fully powered on state. Once woken from sleep, the display device is dimmed or at normal brightness. The level of dimming of the display device is determined based on user engagement.

The power manager 232 is responsible for managing power usage for the computing device. The power manager 232 administers a system-wide power policy and tracks the path of power input/output requests through the system. In some implementations, the power manager 232 is configured to not respond to the dim signal 230 or the lock signal 236. For example, if there is an active power request for the display device (e.g., a movie is playing on the display device) the power manager 232 will not dim or lock the display device even if it receives a dim signal 230 or a lock signal 238. Similarly, in an implementation, if the display device was manually put into a sleep state, the power manager 232 will not respond to the wake signal 238 even if a user is staring directly at the display device.

In embodiments, the power manager 232 receives an input idle notification 240 from the OS input stack 242. The input idle notification 240 provides an indication that a user is idle based on the lack of user input from an input device for more than a threshold duration of time. The input idle notification 240 causes the same behavior in the power manager 232 as the dim signal 230 or the lock signal 236. However, the dim signal 234 is sent sooner than the input idle notifications 240 resulting in earlier dimming of the display device and additional power savings.

Figure 3:
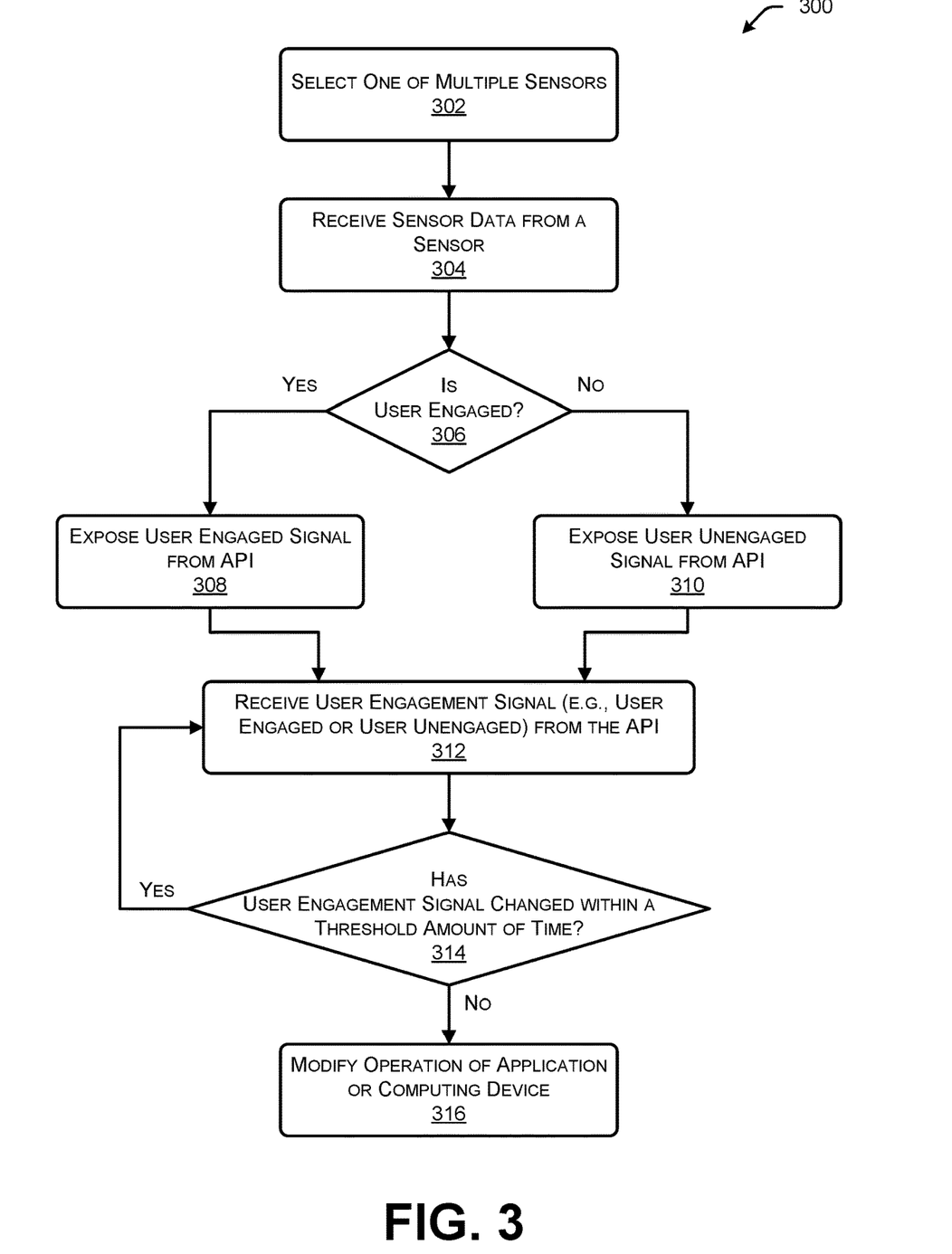
FIG. 3 is a flow diagram showing aspects of an example method for generating and using a user engagement signal.

FIG. 3 is a flow diagram showing aspects of a method 300 for generating and using a user engagement signal. In some implementations, method 300 can be performed with the environment of FIG. 1 and/or the stack of FIG. 2.

At operation 302, one or more sensors is selected if multiple sensors are present. One or more sensors may not be positioned to determine if a user is directing their attention to an active display device. For example, a sensor in the bezel of a laptop computer that has the lid closed and is connected to an external monitor will not be able to provide useful data for determining if the user is looking at the external monitor. Thus, if the computing device includes a first sensor and a second sensor, one of those two sensors is selected as the source of sensor data. In some implementations, the selection of either the first sensor or the second sensor is based on a location of the first sensor and the second sensor relative to the display device. Selection of one of multiple sensors to use as the source of sensor data for determining user engagement is referred to as arbitration. In one implementation, one or more of the sensors is a camera.

In one implementation, external sensors have priority over internal sensors and, when connected to the system. In one implementation, if an external monitor is present and the only sensor is an internal sensor, adaptive dimming is disabled based on the assumption that the internal sensor is not in a suitable position to determine if the user is directing their attention to the external monitor. In one implementation, the user can manually select which sensor to use. In one implementation, a default sensor is remembered by the system and will be used until the user chooses another sensor. In one implementation, multiple sensors are used as alternatives so that if any sensor produces sensor data indicating user engagement (e.g., multiple display devices each with a sensor and the user is looking at any of the display devices) the user is determined to be engaged.

At operation 304, sensor data is received from a sensor. The sensor data is received by a sensor driver. In some implementations, sensor data is received from multiple sensors. Based on the selection at operation 302, sensor data from one, more than one, all but one, or even all the sensors are ignored. If sensor data from all the sensors is ignored, user engagement cannot be determined and method 300 ends.

At operation 306, a determination is made regarding the user being engaged or unengaged. In one implementation, the determination is made by the sensor, such as by firmware that is part of the sensor. In one implementation, the determination is made based on a facial yaw angle identified from the sensor data. Thus, if the user is looking at the display device or not determines user engagement. The determination is passed to an API that abstracts the raw sensor data into a signal indicating user engagement.

If the user is engaged, method 300 follows the "yes" path to operation 308 where a "user engaged" signal is exposed from the API. If the user is not engaged, method 300 follows the "no" path to operation 310 where a "user unengaged" signal is exposed from the API. Although shown as a binary condition in method 300, in other implementations the user engagement signal exposed by the API may take an intermediate value such as "partially engaged." If the sensor is a HID device, the API exposes the sensor as an HID device. In one implementation, the API is included in an OS sensor stack of the computing device.

At operation 312, the user engagement signal is received by an application running on the computing device or an OS of the computing device. The user engagement signal is received directly from the API or it is processed by a user engagement monitoring service before passing it to a component of the OS. For example, the user engagement signal is provided as an input to a state machine. In one implementation, the state machine takes the user engagement signal and a power state of a hardware component (e.g., display device 102) and determines a signal or command to generate based on those inputs.

At operation 314, it is determined if the user signal has changed within a threshold amount of time. Operation 314 provides a debounce mechanism. If the behavior of the user is near a cutoff for changing from engaged to unengaged, frequent changes of the user engagement signal results in undesirable behavior of the computing device. For example, a display device could potentially dim every time the user looks out a window. To avoid this, in some implementations, a time delay (e.g., 30 s) is implemented before acting on a changed user engagement signal. In one implementation, a delay is introduced only when responding to a user unengaged signal and not to a user engaged signal. The threshold amount of time is set by the system or it is user configurable.

If the user engagement signal has changed within the threshold amount of time, method 300 proceeds along the "yes" path and returns to operation 312. The system is then waiting to determine if the same user engagement signal is maintained for the threshold amount of time. If the user engagement signal has not changed within the threshold amount of time (e.g., remained the same) then method 300 proceeds along the "no" path to operation 316.

At operation 316, the operation of an application or operation of the computing device is modified based on the user engagement signal. There are many possible ways that an application or the computing device could be modified. In one implementation, the computing device is modified by changing the brightness of a display device. For example, the display device is dimmed in response to a user unengaged signal. As a further example, an application is modified by pausing playback of an audio or video file in response to a user unengaged signal. An additional example of modifying an application or the computing device, a microphone is muted in response to a user unengaged signal. Additionally, in an implementation, an application or OS of the computing device is modified to increase the volume of alerts in response to a user unengaged signal.

Figure 4:
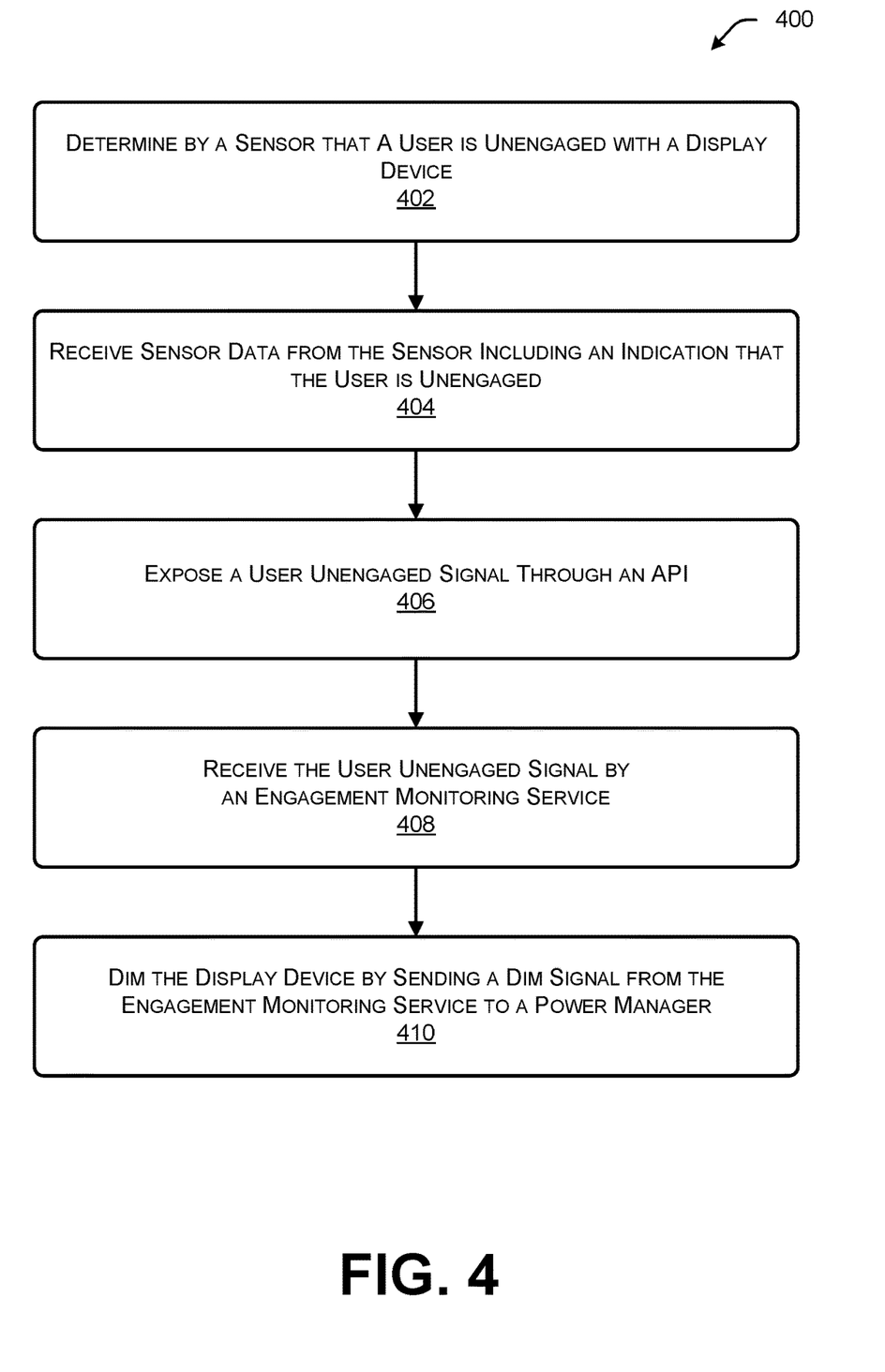
FIG. 4 is a flow diagram showing aspects of an example method for using image data of a user from a camera to dim a display device.

FIG. 4 is a flow diagram showing aspects of a method 400 for using image data of a user from a camera to dim a display device. In some implementations, method 400 can be performed with the environment of FIG. 1 and/or the stack of FIG. 2.

At operation 402, a sensor determines that a user is unengaged with the display device. The sensor is communicatively coupled to a computing device. Firmware in the sensor makes the determination that the user is unengaged. In an implementation, the sensor is a camera. In one implementation, the sensor is a HID.

In one implementation, the sensor configured to detect human faces. For example, the sensor is a camera or other type of sensor that uses infrared or radio waves to detect shapes and identify one of those shapes as a human face. The user is identified as unengaged with the display device baseline determination that the user's face is not oriented towards the display device.

In some implementations, the sensor is a camera that includes a sensing function that captures an image frame and processes the image frame to determine the presence of a human user. In some implementations, the presence sensing function evaluates the image frame for the presence of a human face. A low-resolution image may be used to determine presence information. For example, in some implementations, an image frame captured by the presence sensing function is less than 64×64 pixels. In some implementations, the image frame captured by the presence sensing function is less than 48×48 pixels.

In implementations, the presence sensing function uses edge detection to determine the shape of the user's head and/or facial features to identify the presence of a human user. In some implementations, the presence sensing function captures a plurality of image frames and compare a first image frame to a second image frame to check for movement of the user. If movement of the suspected user relative to the camera sensor is not detected, the shape in the captured image may not be a human user. Movement checks can limit false positives in the presence sensing.

A determination is made based on the image data that a user is unengaged with a display device. For example, the user is characterized as unengaged with the display device based on the user attention being directed away from the display device. In one implementation, determining that the user is unengaged with the display device includes detecting a face in the image data and determining that the face is not oriented towards the display device. For example, the face is determined to be not oriented towards the display device based on determining that a facial yaw angle is greater than +/−45° relative to the perpendicular of the display device.

At operation 404, sensor data is received from the sensor including an indication that the user is unengaged. In one implementation, the sensor data is received at a sensor driver. In some implementations, the sensor data does not include images captured by the sensor. In some implementations, the sensor data includes only the indication that the user is unengaged and not include any of the other data captured by the sensor. This protects user privacy by keeping images of the user's face on the sensor without sharing facial images with other components of the computing device.

At operation 406, a user unengaged signal is exposed through an API in an OS sensor stack of the computing device. In one implementation, the sensor driver is part of the same OS sensor stack as the API.

At operation 408, the user unengaged signal is received by an engagement monitoring service. In an implementation, the engagement monitoring service includes a state machine and the state machine determines a signal to generate by the engagement monitoring service based on a user engagement signal (e.g., user unengaged) received from the API and a current power state of the display device (e.g., powered on, full brightness).

At operation 410, the display device is dimmed by sending a dim signal from the engagement monitoring service to a power management component. In an implementation, the engagement monitoring service includes a debounce mechanism that does not generate the dim signal unless the user unengaged signal has been received for at least a threshold amount of time (e.g., 10, 20, 30 seconds).

Figure 5:
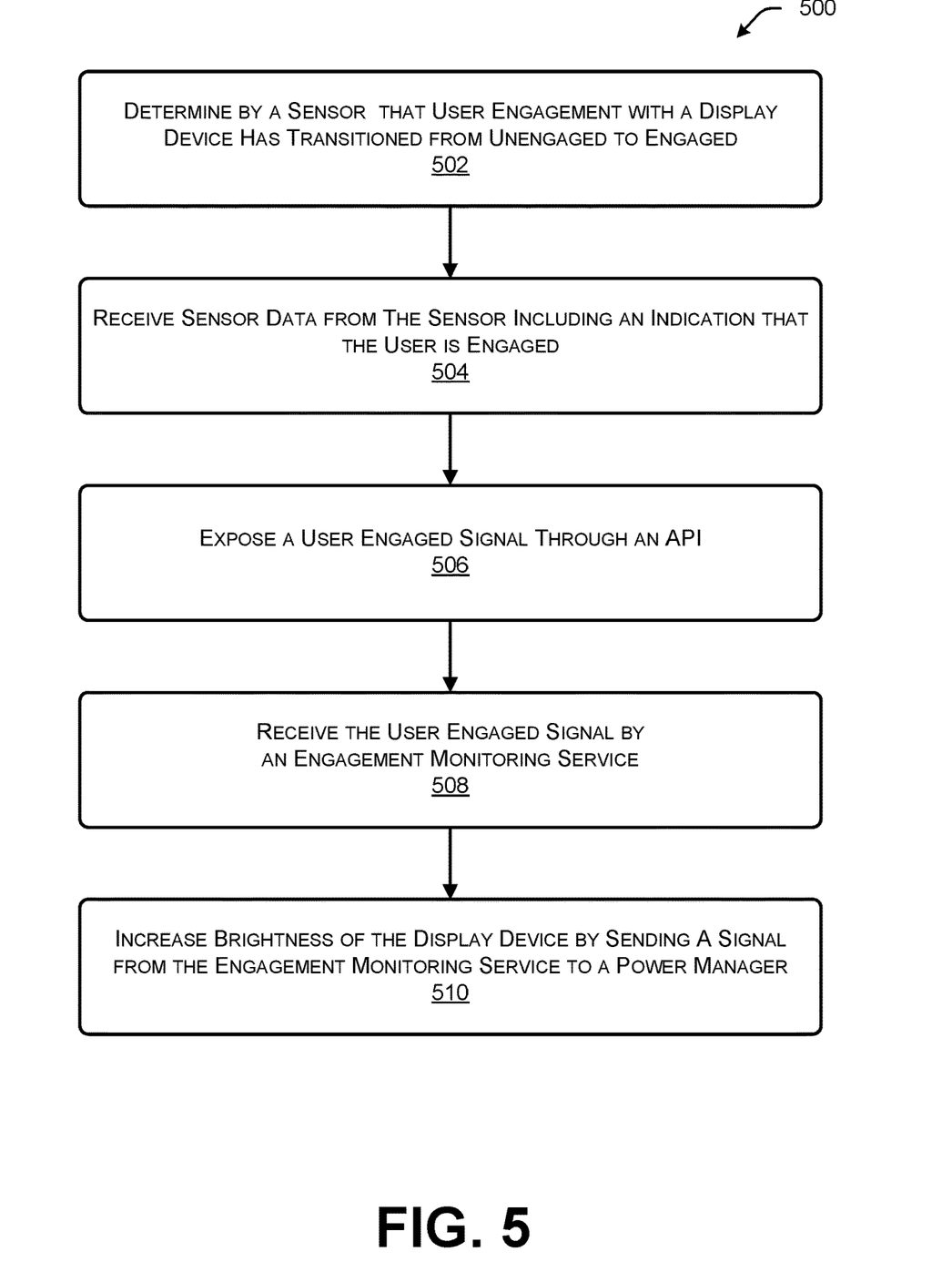
FIG. 5 is a flow diagram showing aspects of an example method for using image data of a user from a camera to increase the brightness a display device.

FIG. 5 is a flow diagram showing aspects of a method 500 for using image data of a user from a camera to increase the brightness a display device. In some implementations, method 500 can be performed with the environment of FIG. 1 and/or the stack of FIG. 2.

At operation 502, the sensor determines that engagement of a user with display device has transitioned from unengaged to engaged. This occurs when the user once again looks at the display device after having looked away for a period of time. The transition may also occur when the user returns to the computing device from being away resulting in a transition from not present to engaged. The sensor is communicatively coupled to the computing device. Firmware in the sensor makes the determination that the user has transitioned from unengaged to engaged. In an implementation, the sensor is a camera. In an implementation, the sensor is a HID.

In some implementations, the sensor is a camera that includes a sensing function that captures an image frame and processes the image frame to determine the presence of a human user. In some implementations, the presence sensing function evaluates the image frame for the presence of a human face. A low-resolution image is used to determine presence information. For example, in some implementations, an image frame captured by the presence sensing function is less than 64×64 pixels. In some implementations, the image frame captured by the presence sensing function is less than 48×48 pixels.

The presence sensing function uses edge detection to determine the shape of the user's head and/or facial features to identify the presence of a human user. In some implementations, the presence sensing function captures a plurality of image frames and compare a first image frame to a second image frame to check for movement of the user. If movement of the suspected user relative to the camera sensor is not detected, the shape in the captured image may not be a human user. Movement checks can limit false positives in the presence sensing.

In one implementation, determining that the user is now engaged with the display device includes detecting a face in the image data and determining that the face is oriented towards the display device. For example, the face is determined to be oriented towards the display device based on determining that a facial yaw angle is less than +/−45° relative to the perpendicular of the display device.

At operation 504, sensor data is received from the sensor including an indication that the user is engaged. In one implementation, the sensor data is received at a sensor driver. In one implementation, the image data is received at a sensor driver. In one implementation, the image data is not transmitted to a sensor driver. In some implementations, the sensor data includes only the indication that the user is engaged and not include any of the other data captured by the sensor. This protects user privacy by keeping images of the user's face on the sensor without sharing facial images with other components of the computing device.

At operation 506, a user engaged signal is exposed through an API in an OS sensor stack of the computing device. In one implementation, the sensor driver is part of the same OS sensor stack as the API.

At operation 508, the user engaged signal is received by an engagement monitoring service. In an implementation, the engagement monitoring service includes a state machine and the state machine determines a signal to generate by the engagement monitoring service based on a user engagement signal (e.g., user engaged) received from the API and a current state of the display device (e.g., powered on, dimmed).

At operation 510, brightness of the display device is increased by sending a wake signal that wakes the display device from a sleep state or an un-dim signal that brightens a dimmed display. The wake signal or the un-dim signal are sent from the engagement monitoring service to a power management component. Waking the display device from the sleep state results in an increase power consumption of the display device and causes an image to be displayed on the display device. Un-dimming of the display device increases the brightness of an image that is already displayed on the display device.

For ease of understanding, the processes discussed in FIGS. 3-5 are delineated as separate operations represented as independent blocks. However, these separately delineated operations should not be construed as necessarily order dependent in their performance. The order in which a process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Figure 6:
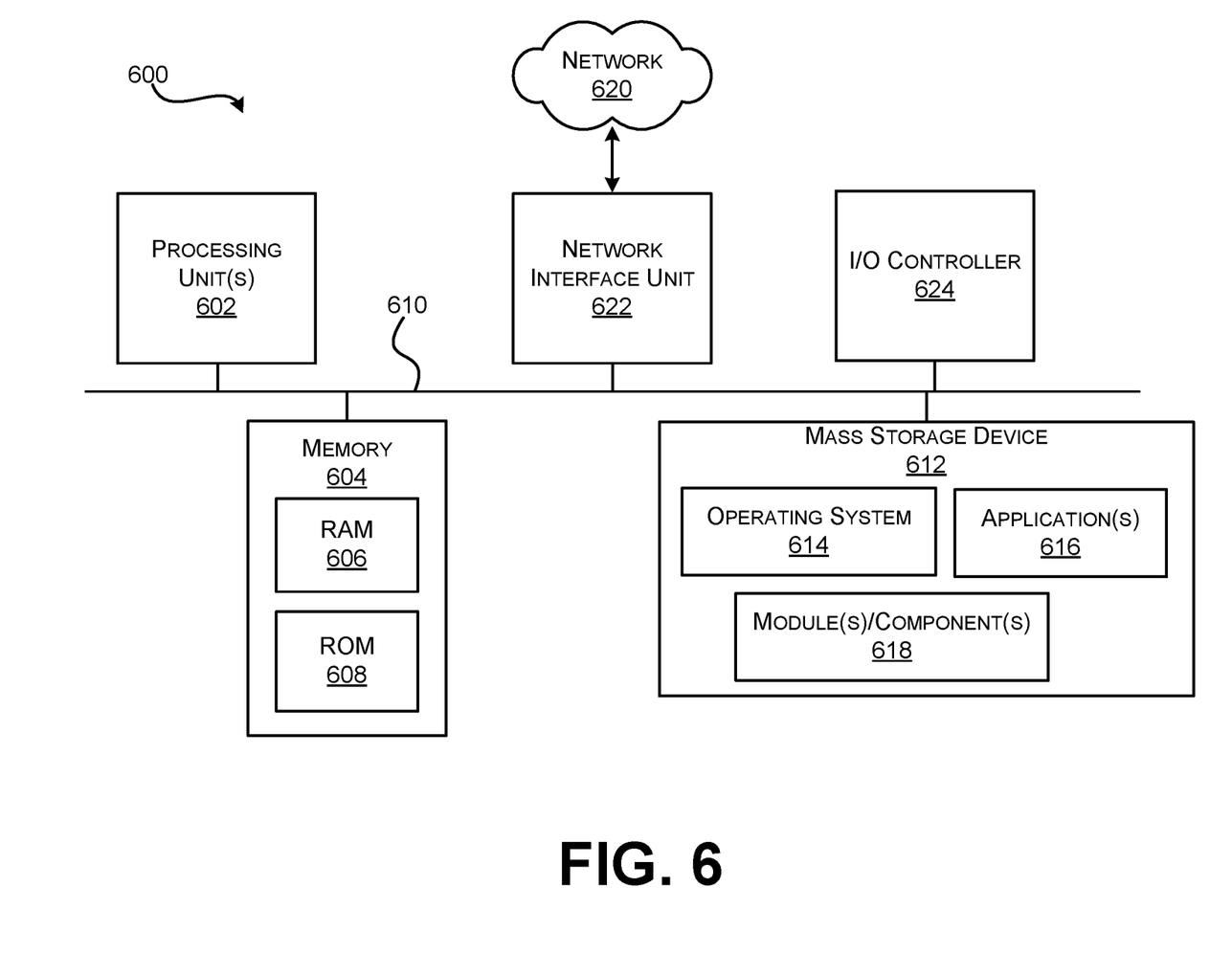
FIG. 6 is a computer architecture diagram illustrating an example computer hardware and software architecture for a computing system capable of implementing aspects of the techniques and technologies presented herein.

FIG. 6 shows additional details of an example computer architecture 600 for a device, such as a computer or a server capable of executing computer instructions (e.g., a module or a component described herein). In an implementation, one or more of the components of computer architecture 600 are distributed throughout a cloud-based system. The computer architecture 600 illustrated in FIG. 6 includes processing unit(s) 602, a system memory 604, including a random-access memory 606 ("RAM") and a read-only memory ("ROM") 608, and a system bus 610 that couples the memory 604 to the processing unit(s) 602. The processing units 602 may also comprise or be part of a processing system. In various examples, the processing units 602 of the processing system are distributed. Stated another way, one processing unit 602 of the processing system may be located in a first location (e.g., a rack within a datacenter) while another processing unit 602 of the processing system is located in a second location separate from the first location.

Processing unit(s), such as processing unit(s) 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules/components 618, and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage medium or communications medium that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic rRAM (DRAM), phase-change memory (PCM), ROM, erasable programmable ROM (EPROM), electrically EPROM (EEPROM), flash memory, compact disc ROM (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network-attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer-readable storage medium does not include communication medium. That is, computer-readable storage media does not include communications media and thus excludes media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. An I/O controller 624 may also be connected to the bus 610 to control communication in input and output devices.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transitions between states, thereby transforming the transistors or other discrete hardware elements constituting the processing unit(s) 602.

Illustrative Embodiments

The following clauses describe multiple possible embodiments for implementing the features described in this disclosure. Every feature from any given embodiment is not required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A system comprising: a sensor (108) configured to provide sensor data (206); a computing device (104/600) communicatively coupled to the sensor, the computing device comprising: a processing system (602); and a computer-readable medium having encoded thereon instructions that, when executed by the processing system, cause the computing device to: receive sensor data from the sensor (e.g., received by a sensor driver (208)); receive, by an application running on the computing device or an operating system (OS) of the computing device, a user engagement signal from an Application Programming Interface (API), the user engagement signal being based on the sensor data; and modify operation of the application or the computing device based on the user engagement signal.

Clause 2. The system of clause 1, wherein the operation of the computing device comprises operation of a hardware component of the computing device and wherein modifying the operation of the computing device comprises modifying the operation of the hardware component based on output of a state machine configured to take the user engagement signal and a power state of the hardware component as inputs.

Clause 3. The system of clause 1 or 2, wherein the sensor is a Human Interface Device (HID) and the API exposes the sensor as an HID device.

Clause 4. The system of any of clauses 1-3, wherein the computing device further comprises a display device, wherein the sensor is a camera, wherein the sensor data indicates that the user is looking at the display device, and wherein as inputs the user engagement signal is a user engaged signal.

Clause 5. The system of any of clauses 1-4, wherein the API is included in an OS sensor stack (202) of the computing device.

Clause 6. The system of any of clauses 1-5, the sensor is a first sensor and the computing device comprises a second sensor, and wherein the instructions encoded on the computer-readable medium further cause the computing device to select the first sensor to provide the sensor data that is received.

Clause 7. The system of any of clauses 1-6, further comprising a display device, wherein: the user engagement signal is a user unengaged signal; and modifying the operation of the computing device comprises dimming a display device.

Clause 8. The system of any of clauses 1-7, wherein the sensor is a camera

Clause 9. The system of any of clauses 1-8, wherein the sensor is a Human Interface Device (HID).

Clause 10. A system comprising: a means for sensing (108) configured to provide sensor data (206) to a computing device (104/600); the computing device comprising: a processing system (602); and a computer-readable medium having encoded thereon instructions, that when executed by the processing system, cause the computing device to: receive sensor data from the means for sensing by a sensor driver (208); expose the sensor data through an Application Programming Interface (API) (212) as a user engagement signal (204); receive from the API, by an application (216) running on the computing device or an operating system (OS)(214) of the computing device, the user engagement signal; and modify operation of the application or the computing device based on the user engagement signal.

Clause 11. A method comprising: receiving sensor data from a sensor (108) communicatively coupled to a computing device (104), the sensor data including an indication that a user (106) is unengaged; receiving, by an engagement monitoring service, a user unengaged signal (204) from an Application Programming Interface (API) (212) in an operating system (OS) (214) of the computing device, the user unengaged signal being based on the sensor data; and modifying operation of the OS by sending a signal from the engagement monitoring service to the OS.

Clause 12. The method of clause 11, wherein modifying the operation comprises dimming a display device of the computing device.

Clause 13. The method of clause 11 or 12, further comprising: detecting a face in the sensor data and determining that the face is not oriented towards the display device.

Clause 14. The method of clause 13, wherein determining that the face is not oriented towards the display device is based on determining that a facial yaw angle of the face is greater than +/−45° relative to a perpendicular of the display device.

Clause 15. The method of any of clauses 11-14, wherein the engagement monitoring service comprises a state machine and the state machine determines a signal to send based on the user unengaged signal received from the API and a current power state of the display device.

Clause 16. The method of clause 15, wherein the engagement monitoring service comprises a debounce mechanism that generates the signal in response to determining that the user unengaged signal has been received for at least a threshold amount of time.

Clause 17. The method of any of clauses 11-16, wherein the computing device is communicatively coupled to a second sensor and the method further comprises selecting the sensor or the second sensor as a source of the sensor data, wherein the selecting is based on a location of the sensor and a location of the second sensor relative to the display device.

Clause 18. A method of controlling brightness of a display device (102), the method comprising: receiving sensor data from a sensor (108) communicatively coupled to a computing device, the sensor data including an indication that the user is engaged with the display device; receiving, by an engagement monitoring service (220), a user engaged signal from an Application Programming Interface (API) in an operating system (OS) of the computing device, the user engaged signal being based on the sensor data; and increasing brightness of the display device by sending a signal (e.g., a wake signal (238) or an un-dim signal (234)) from the engagement monitoring service to a power manager (232) of the OS.

Clause 19. The method of clause 18, wherein the sensor data is received at a sensor driver in an OS sensor stack, and wherein the API is in the OS sensor stack.

Clause 20. The method of clause 18 and 19, further comprising determining that the user is engaged with the display device by detecting a face in the sensor data and determining that the face is oriented towards the display device.

Clause 21. The method of clause 20, wherein determining that the face is oriented towards the display device is based on determining that a facial yaw angle of the face is less than +/−45° relative to a perpendicular of the display device.

Clause 22. The method of any of clauses 18-21, wherein modifying the operation of the OS comprises determining that the display device is in a sleep state, wherein the signal is a wake signal that increases brightness of the display device.

Clause 23. The method of any of clauses 18-21, wherein modifying the operation of the OS comprises determining that the display device is in a dimmed state and increasing brightness of an image displayed on the display device.

Clause 24. The method of any of clauses 18-23, wherein the engagement monitoring service comprises a state machine and the state machine determines a signal to generate by the engagement monitoring service based on the user engaged signal received from the API and a current power state of the display device.

Clause 25. The method of any of clauses 18-24, wherein the computing device is communicatively coupled to a second sensor and the method further comprises selecting the sensor or the second sensor as a source of the sensor data, wherein the selecting is based on a location of the sensor and a location of the second sensor relative to the display device.

Clause 26. The method of any of clauses 11-25, wherein the sensor is a camera.

Clause 27. The method of any of clauses 11-25, wherein the sensor is a Human Interface Device (HID).

Clause 28. A computer-readable storage medium having instructions stored thereupon that, when executed by a processing system of a computing device, cause the computing device to perform the method of any of clauses 11-27.

CONCLUSION

While certain example embodiments have been described, including the best mode known to the inventors for carrying out the invention, these embodiments have been presented by way of example only. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. Skilled artisans will know how to employ such variations as appropriate, and the embodiments disclosed herein may be practiced otherwise than specifically described. The accompanying claims and their equivalents are intended to cover such forms or modifications as would fall within the scope and spirit of certain of the inventions disclosed herein.

The terms "a," "an," "the" and similar referents used in the context of describing the invention are to be construed to cover both the singular and the plural unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context. The terms "portion," "part," or similar referents are to be construed as meaning at least a portion or part of the whole including up to the entire noun referenced.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different sensors).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system comprising:
a sensor; and
a computing device communicatively coupled to the sensor, the computing device comprising:
a processing system;
a display device; and
a computer-readable medium having encoded thereon instructions that, when executed by the processing system, cause the computing device to:
receive first sensor data from the sensor;
identify, using the first sensor data, that a face of a user is looking away from computing device at a predetermined angle for a predetermined amount of time, wherein the predetermined angle is a facial yaw angle of greater than +/−45 degrees relative to a perpendicular of the display device;
receive, by an application running on the computing device or an operating system (OS) of the computing device, a first user engagement signal from an Application Programming Interface (API), the first user engagement signal being based on the first sensor data and wherein the first user engagement signal indicates the user is unengaged;
determine, by a state machine, a first signal to send based on the first user engagement signal received from the API and a current power state of the display device;
generate, by a debounce mechanism, the first signal in response to determining that the first user engagement signal indicates that the user has been unengaged for at least the predetermined amount of time;
modify operation of the application or the computing device in a first way based on the first signal indicating the user is unengaged for at least the predetermined amount of time;
identify, using second sensor data, that the face of the user is looking at the computing device;
receive, by the application running on the computing device or the operating system of the computing device, a second user engagement signal from the API, the second user engagement signal being based on the second sensor data and wherein the second user engagement signal indicates the user is engaged; and
modify operation of the application or the computing device in a second way based on the second user engagement signal indicating the user is engaged.

2. The system of claim 1, wherein the operation of the computing device comprises operation of a hardware component of the computing device and wherein modifying the operation of the computing device comprises modifying the operation of the hardware component.

3. The system of claim 1, wherein the sensor is a Human Interface Device (HID) and the API exposes the sensor as a HID device.

4. The system of claim 1, wherein the API is included in an OS sensor stack of the computing device.

5. The system of claim 1, wherein the sensor is a first sensor and the computing device comprises a second sensor, and wherein the instructions encoded on the computer-readable medium further cause the computing device to select the first sensor to provide the first sensor data that is received.

6. The system of claim 1, wherein:
modifying the operation of the computing device in the first way comprises dimming the display device.

7. A method, comprising:
receiving first sensor data from a sensor communicatively coupled to a computing device;
identifying, using the first sensor data, that a face of a user is looking away from a display device of the computing device at a predetermined angle for a predetermined amount of time, wherein determining that the face is not oriented towards the display device is based on determining that the predetermined angle is a facial yaw angle of the face;
receiving, by an engagement monitoring service, a first user engagement signal from an Application Programming Interface (API) in an operating system (OS) of the computing device, the first user engagement signal being based on the first sensor data and wherein the first user engagement signal indicates the user is unengaged, wherein the engagement monitoring service comprises:
a state machine that determines a first signal to send based on the first user engagement signal received from the API and a current power state of the display device, and
a debounce mechanism that generates the first signal in response to determining that the first user engagement signal indicates that the user has been unengaged for at least the predetermined amount of time; and
modifying operation of the OS in a first way based on the first signal from the engagement monitoring service, the first signal being based on the first user engagement signal indicating that the user is unengaged for at least the predetermined amount of time;
identifying, using second sensor data that the face of the user is looking at the computing device;
receiving, by the engagement monitoring service, a second user engagement signal from the API, the second user engagement signal being based on the second sensor data and wherein the second user engagement signal indicates the user is engaged; and modifying operation of the OS in a second way based on a second signal from the engagement monitoring service, the second signal being based on the second user engagement signal indicating the user is engaged.

8. The method of claim 7, wherein modifying the operation of the OS in the first way comprises dimming the display device of the computing device.

9. The method of claim 8, wherein modifying the operation of the OS in the second way comprises increasing brightness of an image displayed on the display device.

10. The method of claim 7, wherein the facial yaw angle of the face is greater than +/−45° relative to a perpendicular of the display device.

11. The method of claim 7, wherein the computing device is communicatively coupled to a second sensor and the method further comprises selecting the sensor or the second sensor as a source of the first sensor data, wherein the selecting is based on a location of the sensor and a location of the second sensor relative to the display device.

12. A method of controlling brightness of a display device, the method comprising: receiving first sensor data from a sensor communicatively coupled to a computing device; identifying, using the first sensor data, that a face of a user is looking at the computing device; receiving, by an engagement monitoring service, a first user engagement signal from an Application Programming Interface (API) in an operating system (OS) of the computing device, the first user engagement signal being based on the first sensor data and wherein the first user engagement signal indicates the user is engaged; and increasing brightness of the display device by sending a first signal from the engagement monitoring service to a power manager of the OS; identifying, using second sensor data that the face of the user is looking away from the computing device at a predetermined angle for a predetermined amount of time; receiving, by the application running on the computing device or the operating system of the computing device, a second user engagement signal from the API, the second user engagement signal being based on the second sensor data and wherein the second user engagement signal indicates the user is unengaged; and decreasing brightness of the display device by sending a second signal from the engagement monitoring service to the power manager of the OS wherein the engagement monitoring service comprises a state machine that determines a third signal to send based on the second user engagement signal received from the API and a current power state of the display device, wherein the engagement monitoring service further comprises a debounce mechanism that generates the third signal from the state machine in response to determining that the second user engagement signal indicates that the user has been unengaged for at least the predetermined amount of time, and the third signal from the state machine is a dim signal.

13. The method of claim 12, wherein the first sensor data is received at a sensor driver in an OS sensor stack, and wherein the API is in the OS sensor stack.

14. The method of claim 12, wherein identifying that the user is looking at the computing device comprises detecting the face of the user in the first sensor data and determining that the face of the user is oriented towards the display device.

15. The method of claim 14, wherein determining that the face is not oriented towards the display device is based on determining that the predetermined angle is a facial yaw angle of the face greater than +/−45° relative to a perpendicular of the display device.

16. The method of claim 12, wherein the display device is in a sleep state, and the first signal from the engagement monitoring service is a wake signal that increases brightness of the display device.

17. The method of claim 12, wherein the display device is in a dimmed state and the first signal from the engagement monitoring service is a signal to increase brightness of an image displayed on the display device.

18. The method of claim 12, wherein determining that the face is looking away from the display device is based on determining that the predetermined angle is a facial yaw angle of the face.

19. The method of claim 18, wherein the facial yaw angle is greater than +/−45° relative to a perpendicular of the display device.

* * * * *